United States Patent [19]

Büchner

[11] 3,884,925

[45] May 20, 1975

[54] DIISOQUINOLYL-DIPYRIDYL-BUTANES, THEIR SALTS AND THEIR MANUFACTURING PROCESS

[75] Inventor: Stanislaw Büchner, Birsfelden, Switzerland

[73] Assignee: Sulco Basel AG, Basel, Switzerland

[22] Filed: June 19, 1973

[21] Appl. No.: 371,526

[30] Foreign Application Priority Data
June 19, 1972 Switzerland.......................... 9150/72

[52] U.S. Cl..... 260/288 R; 260/288 BI; 260/295 R; 424/258; 424/263
[51] Int. Cl............................................. C07d 33/50
[58] Field of Search ..................... 260/288 R, 283 BI

[56] References Cited

UNITED STATES PATENTS 3,138,600   6/1964   Fancher et al................. 260/283 BI
3,560,620   2/1971   Schor et al..................... 260/288 R

*Primary Examiner*—Donald G. Daus
*Assistant Examiner*—M. Vaughn
*Attorney, Agent, or Firm*—Wenderoth, Lind & Ponack

[57] ABSTRACT

The present invention relates to new diisoquinolyl-dipyridyl-butanes, their salts with inorganic and organic acids and their manufacturing processes. The compounds and their salts possess valuable pharmacodynamic properties and are therefore suitable for use as medicines.

2 Claims, No Drawings

DIISOQUINOLYL-DIPYRIDYL-BUTANES, THEIR SALTS AND THEIR MANUFACTURING PROCESS

The present invention relates to new diisoquinolyl-dipyridyl-butanes, their salts with inorganic and organic acids and their manufacturing processes. The compounds and their salts possess valuable pharmacodynamic properties and are therefore suitable for use as medicines.

The compounds according to the invention are di-(1-isoquinolyl)-di-(2-pyridyl)-butanes and correspond to the formulae A—A, A–B and B—B, in which A and B represent the following groups:

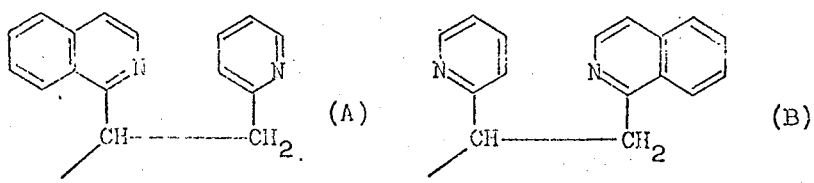

It is also possible to represent the groups A and B by the partial formulae:

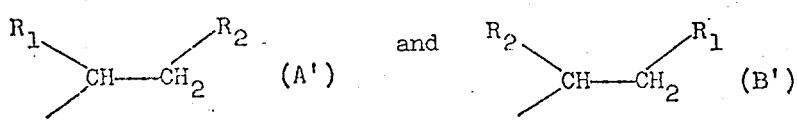

in which $R_1$ denotes the 1-isoquinolyl group and $R_2$ the 2-pyridyl group. Thus, the compounds according to the invention can also be defined by the following formulae:

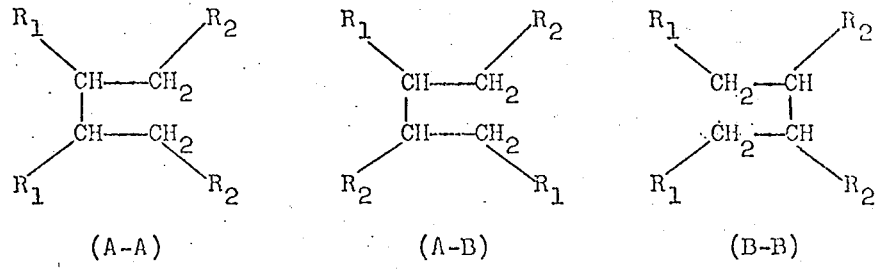

in which $R_1$ and $R_2$ have the above meaning.

The new compounds are thus 2,3-di-(1-isoquinolyl)-1,4-di-(2-pyridyl)-butane (formula A-A), 1,3-di-(1-isoquinolyl)-2,4-di-(2-pyridyl)-butane (formula A-B) and 1,4-di-(1-isoquinolyl)-2,3-di-(2-pyridyl)-butane (formula B—B). The invention also encompasses mixtures of these compounds and the various isomers thereof.

In the pure stage, the compounds are solid, crystalline substances of well-defined melting point. They are sparingly soluble in water but dissolve in the lower alkanols, such as methanol and ethanol, in the lower aliphatic ketones, such as acetone and ethyl methyl ketone, and in the lower alkyl esters, such as methyl acetate and ethyl acetate, especially when warm. They are comparatively easily soluble in the aromatic hydrocarbons, such as benzene, toluene and the like, and in the halogenated hydrocarbons, such as chloroform, carbon tetrachloride, 1,2-dichloroethane, chlorobenzene and the like.

Because of the four basic nitrogen atoms present in the molecule, the compounds are tetra-acid bases and the corresponding salts contain 4 equivalents of the acid per mol of base. As examples of acids which are suitable for the formation of salts there may be mentioned hydrochloric acid, hydrobromic acid, sulphuric acid and phosphoric acid amongst the inorganic acids and acetic acid, benzoic acid, succinic acid, maleic acid, fumaric acid, malic acid, tartaric acid, methanesulphonic acid and benzenesulphonic acid amongst the organic acids. The salts of strong acids are preferred since they are readily soluble in water and aqueous solvents.

The process according to the invention for the manufacture of the compounds of the above formulae A—A, A-B and B—B and of their salts consists of subjecting a vinyl compound of the formula:

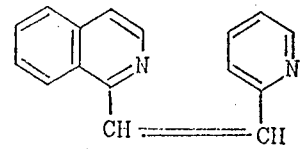

or a salt thereof to a catalytic hydrogenation under conditions under which the isoquinoline ring is not hydrogenated and isolating the compound or compounds or mixture thereof, of melting point above 160°C, from the resulting hydrogenation product and optionally reacting it or them with an inorganic or organic acid.

The fact that one is actually dealing with a hydrogenation product can be seen from the following observations. (1) The treatment with potassium permanganate in acetone proves negative, that is to say no permanganate is consumed, which indicates the absence of the olefinic double bond (in the same experiment, the starting product gives a positive reaction). (2) The starting product is yellow, presumably due to the conjugation of the two hetero-aromatic rings via the vinyl double bond; on the other hand, the product obtained is colourless, which indicates that the conjugation has been cancelled or the double bond removed. (3) The molecular weight, together with the result of the elementary analysis, indicates the empirical formula $C_{32}H_{26}N_4$ (starting product: $C_{16}H_{12}N_2$). (4) Finally, the Rf value of the product in thin layer chromatography is unmistakeably different, in every solvent system, from that of the starting product, and hence the product is also different from the starting product.

Suitable catalysts are noble metals in a finely divided form, especially platinum and nickel, as well as copper-chromium oxide ($CuO.CuCr_2O_4$).

The hydrogenation is carried out in an inert solvent, the choice of which should depend on the form in which the vinyl compound is employed. This is because, if the free base is employed, lower alkanols, such as methanol and ethanol, and dioxane, for example in the anydrous state, and also mixtures thereof, are especially suitable; it is however, also possible to carry out the hydrogenation in glacial acetic acid, ethyl acetate or mixtures of the latter with glacial acetic acid or ethanol. On the other hand, if the starting product is employed in the form of a salt, water or aqueous solvents, preferably aqueous lower alkanols, are used advantageously.

The temperature and pressure conditions observed during the hydrogenation should be such that the isoquinoline ring is not hydrogenated to the corresponding tetrahydroisoquinoline. This prerequisite can, however, be fulfilled without particular difficulties, since the vinyl double bond is hydrogenated easily, that is to say under mild or gentle conditions whilst the isoquinoline ring remains unattacked. Hence, the hydrogenation will preferably be carried out at room temperature or slightly elevated temperature, for example at 20° or 30°C, and under normal or slightly elevated pressure, for example under 1 or 2 atmospheres gauge. Furthermore, the hydrogen absorption can also be followed volumetrically and the hydrogenation can be discontinued after the absorption of hydrogen has ceased.

After the hydrogenation has been carried out, the catalyst is removed by filtration, for which filtration aids such as, for example, kieselguhr, are employed advantageously. Thereafter, the filtrate can be evaporated to dryness and the resulting base mixture can be subjected to a further purification by conversion into a salt, for example the tetrahydrochloride, and liberation of the base. After recrystallisation, for example from anhydrous ethanol or acetone, the hydrogenation product is obtained in the form of a solid, crystalline substance, which admittedly still contains impurities or by-products.

The desired compound or compounds or mixtures thereof can be isolated from the crude hydrogenation product by means of the customary methods of separation which are known to those skilled in the art. Adsorption chromatography, distribution chromatography and counter current distribution have proved particularly suitable for this purpose. In the chromatographic methods, aluminium oxide or silica gel are advantageously used as adsorbents. In adsorption chromatography the elution is, for example, first carried out with mixtures of carbon tetrachloride and benzene, then with benzene alone and finally with mixtures of benzene and chloroform. A mixture of xylene, ethyl methyl ketone and diethylamine has proved particularly suitable as a solvent system for distribution chromatography.

The course of the isolation can best be followed by subjecting samples of the individual fractions obtained to thin layer chromatography. Suitable running agents are a mixture of pyridine, dioxane, ethanol and water and above all anhydrous acetone, the latter giving better separation. Fractions of the hydrogenation product which appear identical in UV light can then be combined with one another. Experience has shown that the fractions of which the residue has a melting point above 160°C contain the desired compounds.

1-(1-Isoquinolyl)-2-(2-pyridyl)-ethylene, required as the starting product, can be obtained by reacting 1-methylisoquinoline and pyridine-2-aldehyde in the presence of a condensation agent which splits off water, such as, for example, zinc chloride. The reaction is preferably carried out at elevated temperature, at the boiling point of the solvent if a solvent is used. Suitable solvents are above all aromatic hydrocarbons, such as benzene, toluene, xylene, chlorobenzene and the like; it appears more advantageous to carry out the condensation in a solvent. The isolation and purification of the reaction product can be carried out according to the customary methods, for example by evaporation of the solvent and recrystallisation of the residue. First, however, the condensation agent used should be removed, which can be achieved by extracting the reaction mixture by shaking with water or an aqueous solution.

As already mentioned initially, the compounds are distinquished by valuable pharmacodynamic properties coupled with low toxicity, especially by spasmolytic, analgesic, central-sedative and blood pressure-lowering effects; in addition, they exert a protective effect on the cardiac muscle in experimental cardiopathies. The pharmacological investigation was carried out with a mixture of the tetrahydrochlorides.

The acute toxicity — LD 50 — was determined in mice on intravenous and oral administration. For this, male mice of the NMRI strain, of body weight 20 to 25 g, are used and employed in groups of 10 animals per dose and per type of administration. The tetrahydrochloride is dissolved in distilled water and the solution is given in a volume of 0.2 ml per 10 g. of body weight in the case of intravenous administration and of 0.3 ml per 10 g of body weight in the case of oral administration. The following values are obtained:

| Method of administration | pH | LD 50 | Confidence Limit |
|---|---|---|---|
| intravenously | 2.4 | 50 mg/kg | approx. 37–67 mg/kg |
| orally | 1.3 | 1,840 do. | approx. 1,600–2,150 |

10 minutes after oral administration, a slowing down of the frequency of respiration muscle hypotonia and, in part, an ataxia; animals which died first showed rotatory spasms, severe shortage of breath and lateral position. At the lower dosages, the surviving animals showed no further toxicological symptoms after 6 hours and at the higher dosages after 2–3 days. On intravenous administration, the same symptoms manifest themselves but recovery is more rapid, namely after 15 to 60 minutes at the lower dosages and within 24 hours at the higher dosages. In this context it should also be noted that in man the action already manifests itself at a dose of 15 mg/day.

The sub-chronic toxicity was also investigated over 90 days. For this, 30 Wistar rats were used, of which 10 animals were used as the control group, 10 animals as test group I (2 mg/kg given daily, subcutaneously) and 10 animals as test group II (5 mg/kg given daily into the stomach by means of a probang). During the experiment, no differences were observed between the three groups; after 90 days a histological test (liver, heart, kidney, adrenal glands, lungs, spleen, stomach and small intestine) showed no anomalies other than traces of lipids in the liver of three animals.

The spasmolytic action can be demonstrated, inter alia, on isolated organs, for example on the isolated ileum and uterus of quinea-pigs, down to a dilution of $4.4 \times 10^{-6}$ or $6 \times 10^{-6}$ respectively. On isolated small intestines of rats, a barium chloride solution causes a contraction which is cancelled by the tetrahydrochloride mixture or by papaverine in a dilution down to $7.5 \times 10^{-6}$ or $5 \times 10^{-6}$ respectively.

The compounds show analgesic properties at a similar dosage to morphine hydrochloride. In experiments on rats by electric stimulation of the dental pulp, this effect is already observable at an intraperitoneal dose of 2 – 3 mg/kg.

Amongst further effects on the central nervous system, the sedative effect should be mentioned. It can be demonstrated, for example, in mice by an inhibition of the spontaneous motor activity: if 5 movements per 10 minutes are recorded on average in the case of (untreated) control animals, this number rises to 138 after oral administration of 400 mg/kg of caffeine, whilst in the case of prior treatment with the tetrahydrochloride mixture (500 mg/kg, given orally) the corresponding caffeine excitation manifests itself in only 66 movements. In rats, a distinct boosting of barbiturate narcosis after prior treatment with the compounds is observable; thus, the duration of sleep after 120 mg/kg of hexobarbital (administered intraperitoneally) is lengthened between 3-fold and 6-fold through prior treatment with 5, 10 or 15 mg/kg (administered intraperitoneally).

The blood pressure-lowering effect can be demonstrated, for example, in cats under pentotal narcosis. At an intravenous dose of 0.5 to 3.0 mg/kg, a brief lowering of the blood pressure is observed, which is particularly pronounced if the blood pressure is artificially increased beforehand by administration of ephedrine (2.5 mg/kg administered intravenously). High doses, that is to say, those above 10 mg/kg, cause deeper breathing and slowing down of the frequency of breathing, due to the initial lowering of the blood pressure.

The protective effect exerted by the compounds on the cardiac muscle in experimental cardiopathies appears particularly worth mentioning. Such illness symptons can be brought about in rats through repeated administration, over the course of several days, of postpituitary extract, ergotamine, cobalt chloride or isoprenaline. These methods lead to morphological changes in the heart, to changes in the electrocardiogram and to pathological disturbances of the biochemical data of the body fluids, detectable in the blood serum. If, however, the tetrahydrochloride mixture is also simultaneously administered to the test animals, in a dose of 5 or 10 mg/kg (administered intraperitoneally), a normalisation of the electrocardiogram and elimination of the changes in the heart muscle to be observed on histological examination results, in comparison to the animals treated only with the preparations mentioned above. Equally, the biochemical values normalise such as, inter alia, the creatine phosphokinase activity and the content of free fatty acids.

In experimental cardiopathies, the new compounds are several-fold more active than dipyridamol; furthermore, the central-sedative and analgesic effects — which are not present in the case of dipyridamol — would probably be advantageous in future use. Finally, the compounds lengthen the refractory time of the heart and as a result exert a certain anti-arrhythmic effect, whilst dipyridamol increases the heart rate.

The spectrum of effects which has been described, and above all the protective effect on the cardiac muscle, justify the expectation of a favourable therapeutic effect of the preparation in the case of myocardiopathies of various origins.

An initial exploratory clinical investigation of the preparation has confirmed the correctness of the therapeutic indication mentioned. For this, 29 patients (21 men and 8 women) aged 42 to 74 years, suffering from coronary insufficiency, were selected. 9 patients had suffered a cardiac infarction recently or in the previous year, whilst in the case of one further patient a cardiac infarction was imminent.

In all cases, an observation phase of a few days was first observed, in which only tranquillisers were administered. Thereafter, the preparation was administered in a daily dose of 15 to 30 mg given orally over a period of 3 to 50 days.

The patients completed daily a questionnaire in which they stated the character of the pain and the number and intensity of the attacks of pain. During the observation phase and at the end of the treatment, the pulse and blood pressure were determined, an electrocardiogram was recorded and the following additional examinations were carried out: counting the thrombocytes, urine status, alanine- and asparagine-aminotransferase activity, sugar level and cholesterol level in the blood serum and blood serum lipoproteids (by paper electrophoresis).

If the results of the treatment are summarised it is found that the subjective symptoms manifesting themselves as painful complaints in the region of the heart disappeared entirely in the case of 13 patients. Furthermore, a considerable reduction in the intensity and frequency of pain was observable in the case of 10 further patients. In taking account the subjective symptoms, a positive result was thus obtained in the case of 23 out of 29 cases examined. An electrocardiographic improvement was shown in the case of 8 patients.

If the findings obtained before and at the end of the treatment are compared with one another, it can be noted that apart from a tendency to slow down the heart rate, the preparation has no distinct influence on the circulatory system. The blood pressure did not change significantly. The patients made no statements from which side-effects or toxic effects of the medicine could have been concluded. Furthermore, the results of the additional investigations carried out before and at the end of the treatment showed no significant differences. In particular, they showed no changes in the urine status, in the blood condition and in the number of thrombocytes; the aminotransferase activity and the blood sugar level and cholesterol level varied within the normal values.

The active compounds are preferably administered orally or parenterally in the form of pharmaceutical preparations; they are advantageously used therapeutically in the form of their salts. For this purpose, they or their salts are formulated with the customary excipients and auxiliaries to give tablets, dragées, drip solutions injection solutions, suppositories and the like. Hence, the invention also encompasses pharmaceutical preparations which contain a compound of the formula A—A, A–B or B—B or mixtures thereof of their salts.

The examples which follow are intended to explain how the invention is carried out but in no way to restrict its scope. The melting points given in the examples are corrected; they were determined on the Mettler FP5 melting point apparatus.

Manufacture of the starting product

Method a

A mixture of 77.6 g of 1-methylisoquinoline (0.543 mol), 59.3 g of pyridine-2-aldehyde (0.554 mol) and 1.52 g of anhydrous zinc chloride is kept for 6 hours at a temperature of 160°C in a steel bomb under a nitrogen atmosphere. After completion of the splitting off of water, the reaction product is dissolved in 1,000 ml of 95% strength ethanol and the solution is left to stand until it has crystallised completely. The product which has separated out is filtered off and dried in vacuo; 44.6 g of crystalline crude product (yield: 36% of theory) are obtained, from which 1-(1-isoquinolyl)-2-(2-pyridyl)-ethylene ethylene is obtained, by recrystallisation from 95% strength ethanol, in the form of yellow crystals of melting point 164°C.

Analysis for $C_{16}H_{12}N_2$:

| | | | |
|---|---|---|---|
| Calculated: | C 82.73%; | H 5.21%; | N 12.06%; |
| Found: | C 82.97%; | H 5.49%; | N 11.94%. |

Method b 100 g of 1-methylisoquinoline (0.700 mol), 800 g of xylene and 2.0 g of anhydrous zinc chloride are initially introduced into a reaction flask and heated to the boil under reflux. Thereafter a solution of 76.5 g. of pyridine-2-aldehyde (0.715 mol) in 200 ml of xylene is added dropwise over the course of one hour and the mixture is heated to the boil under reflux for a further 5 hours, whilst stirring. After cooling, the zinc salts are removed by twice extracting the reaction mixture by shaking with 500 ml of aqueous 5% strength sodium hydroxide solution. The xylene solution is dried over sodium sulphate and filtered and the xylene is evaporated in vacuo; the residue is taken up in 800 ml of 95% strength ethanol and the solution is left to stand until it has crystallised completely. 76.0 g of 1-(1-isoquinolyl)-2-(2-pyridyl)-ethylene (yield: 47% of theory) are obtained in the form of yellow crystals of melting point 166° C.

EXAMPLE 1

Hydrogenation over $PtO_2$ in glacial acetic acid.
35.0 g of 1-(1-isoquinolyl)-2-(2-pyridyl)-ethylene, 3.5 g of platinum oxide and 275 ml of glacial acetic acid are suspended in an autoclave having a hydrogen inlet; the hydrogenation is carried out at room temperature under a pressure of 1 atmosphere gauge. After the absorption of hydrogen has ceased, the catalyst is filtered off, the filtrate is evaporated to dryness, the residue is taken up in water and the resulting solution is adjusted to pH 8 with ammonia solution and extracted with chloroform. The chloroform extract is dried over sodium carbonate and evaporated to dryness. 31.3 g of a grey-dark green residue are obtained and are dissolved in 300 ml of 95% strength ethanol; the solution is adjusted to pH 4 with hydrochloric acid and is diluted with 500 ml of water. To remove traces of platinum, the solution is filtered, concentrated to 300 ml, adjusted to pH 8 with ammonia and extracted with chloroform. The chloroform extract is dried over sodium carbonate, filtered and evaporated to dryness; 32.9 g of crystalline residue (yield: 93% of theory) are obtained. After two recrystallisations from absolute ethanol, 29.8 g of base of melting point 206° to 208°C are obtained.

Analysis for $C_{32}H_{26}N_4$:

| | | | | Molecular weight |
|---|---|---|---|---|
| Calculated: | C 82.37%; | H 5.61%; | N 12.01%; | 466.56; |
| Found: | C 82.21%; | H 5.80%; | N 11.98%; | 470. |

The molecular weight given above was determined by the method of R. E. Dohner, A. H. Wachter and W. Simon [Helv. Chem. Acta 50 (1967), 2193] by vapour pressure osmometry on very dilute solutions (sample weight 1.635 mg/g, solvent methylene chloride, calibration constant 8,900, $\Delta R$ 30.94 Ohm, temperature of measurement 25.3°C).

To isolate the desired compounds from the hydrogenation mixture, 2.0 g of base are chromatographed on a column of 60 g of basic aluminium oxide (Alox Merck) and eluted, first with mixtures of carbon tetrachloride and benzene and then with mixtures of benzene and chloroform. The proportion of benzene in the mixture is initially 20% (volume/volume) and is increased stepwise to 100% during the elution; thereafter the elution is continued with mixtures of benzene and chloroform, initially in the ratio of 9:1 (volume/volume). In each case, fractions of 200 ml are collected and evaporated to dryness; the residue — as a rule an oily product — is weighed and caused to crystallise.

For identification, the individual fractions are subjected to a thin layer chromatography. For this, either the pyridine/dioxane/ethanol/water (20:25:50:5) solvent system or, preferably, only anhydrous acetone are used. The fractions which prove identical in UV-light are combined with one another.

Thereafter the combined fractions 34 to 37 (oils) are dissolved in boiling acetone, the solution is filtered and the solvent is evaporated; 255 mg of a product of melting point 176° to 178°C are obtained. The combined fractions 38 to 44 are dissolved in boiling 95% strength ethanol, the solution is filtered and the solvent is evaporated; 510 mg of a product of melting point 209° to 210°C are obtained. The combined fractions 45 to 50 are also dissolved in boiling 95% strength ethanol, the solution is filtered and the solvent is evaporated; 98 mg of a product of melting point 210° to 211°C are obtained.

Repeating the chromatography of the combined fractions 34 to 37 on the one hand and 38 to 50 on the other, on basic aluminium oxide and with the same solvent system as before, gives two maxima, or only one maximum, in the case of all separations.

The mass spectra of the combined fractions 34 to 37, 38 to 44 and 45 to 50 were recorded; it is found that all three mass spectra are identical. On the other hand, the NMR spectra show differences. It is found that fractions 34 to 37 consist of a mixture of two substances, whilst fractions 38 to 44 and 45 to 50 represent a single pure substance.

For preparative separation, 140 mg of substance from the combined fractions 34 to 37 are then subjected to a thin layer chromatography on silica gel using the solvent system xylene/ethyl methyl ketone/methanol/diethylamine (40:40:6:2). The substance is dissolved in chloroform and applied, in this form, to the plate; two runs are carried out, and the separation can be followed in UV-light. After the separation, the compounds are eluted from the individual spots by means of chloroform and are twice recrystallised from acetone.

In this way, the upper spot yields 60 mg of a pure single compound of melting point 190°C and the lower spot yields 55 mg of a pure single compound of melting point 208 C. The NMR spectra show that the compound of melting point 208°C is identical with that from fractions 38 to 50.

EXAMPLE 2

Variant of the isolation of the compounds.

The substance of the combined fractions 34 to 37 is subjected to a chromatography on a silica gel column, using the solvent system xylene/ethyl methyl ketone/diethylamine (40:20:2). 100 g of silica gel (Merck, pure; particle diameter 0.05 to 0.125 mm) are used for this purpose, and 460 mg of substance are mixed with 500 mg of silica gel and employed in this form. The fraction collector is set to 100 drops.

The fractions which are pure and identical according to a thin layer chromatogram are combined and evaporated; the residue is recrystallised from acetone. In this way, the combined fractions 39 to 47 yield 118.4 mg of compound of melting point 190°C and the combined fractions 63 and 64 yield 30.7 mg of compound of melting point 208°C. The compounds proved identical, according to mixed melting point and NMR spectrum, with the compounds of corresponding melting point isolated by means of preparative thin layer chromatography according to Example 1.

The optical rotation of both compounds was determined in methanol solution; the following were found: for the compound of melting point 190°C, $[\alpha]_D^{27} = -1°$ ($c = 0.538\%$); for the compound of melting point 208°C, $[\alpha]_D^{27} = -1°$ ($c=0.438\%$).

EXAMPLE 3

Manufacture of the picrates.

A solution of 10 mg. of compound of melting point 190°C in 1.5 ml of methanol and a solution of 50 mg of pure picric acid in 1 ml of methanol are mixed with one another and shaken vigorously. A lemon-yellow crystalline precipitate is immediately produced and this is filtered off and washed successively with 150 ml of water and 150 ml of methanol. After drying in vacuo at 60°C, 20 mg of picrate of melting point 241.1°C (decomposition) are obtained.

Following the same procedure as already described, 10 mg of compound of melting point 208°C and 50 mg of picric acid yield 19 mg of picrate of melting point 234.2°C (decomposition).

The calculation of the molar ratios shows that the salt contains 4 mols of picric acid per mol of base, in accordance with theory.

EXAMPLE 4

Hydrogenation over $PtO_2$ in ethanol.

4.0 g of 1-[2-(2-pyridyl)vinyl]isoquinoline, 0.4 g of platinum oxide and 40 ml of anhydrous ethanol are suspended in a hydrogenation apparatus; the hydrogenation is carried out at room temperature under normal pressure. After the absorption of hydrogen has ceased, the hydrogenation is stopped and working up and purification is carried out as described in Example 1. 3.63 g of basic product (yield: 91% of theory) are obtained, melting at 179° to 180°C after recrystallisation from acetone.

0.440 g of hydrogenation product is chromatographed on a column of 15 g of basic aluminium oxide and eluted with mixtures of carbon tetrachloride and benzene and of benzene and chloroform (analogously to the procedure of Example 1). Thereafter — in accordance with the result of the thin layer chromatography — fractions 7 to 40 (94.8 mg), 41 to 50 (38.6 mg), 51 to 56 (276.2 mg) and 57 to 59 (12.9 mg) are combined with one another and each group is dissolved in boiling acetone; each of the four acetone solutions is filtered and left to crystallise. The following are obtained from fractions 7 – 40, 62.3 mg of substance of melting point 183.6°C;
from fractions 41 – 50, 30.9 mg of substance of melting point 184.6°C;
from fractions 51 – 56, 222.2 mg of substance of melting point 173.2°C;
from fractions 57 – 59, 11.6 mg of substance of melting point 207.3°C.

According to a thin layer chromatogram (in anhydrous acetone or in the solvent system pyridine/dioxane/ethanol/ water, 20:25:50:5) the substance of the first three fraction groups consists of a mixture of the desired hydrogenation products and of by-products which were not investigated in more detail. On the other hand, the substance of fractions 57 to 59 is identical, according to mixed melting point and NMR spectrum, with the pure single compound of melting point 208°C from Example 1.

EXAMPLE 5

Hydrogenation over Raney Ni in ethanol.

7.5 g of 1-[2-(2-pyridyl)vinyl]-isoquinoline, 7.5 g of Raney nickel and 375 ml of anhydrous ethanol are suspended in a hydrogenation apparatus; the hydrogenation is carried out at room temperature under normal pressure. After 700 ml of hydrogen have been absorbed, the hydrogenation is discontinued, the hydrogenation mixture is filtered over kieselguhr (Celite$^R$) and the light yellow alcohol solution is evaporated to dryness in vacuo. Recrystallisation of the residue in anhydrous ethanol yields 6.5 g of base. For purification, the base is converted into the tetrahydrochloride (melting point 262° to 264°C, with decomposition), again liberated therefrom and again recrystallized from anhydrous ethanol. 3.5 g of base of melting point 199°C are obtained.

2.0 g of base are chromatographed on a column of 60 g of basic aluminium oxide and eluted with mixtures of carbon tetrachloride and benzene and of benzene and chloroform (analogously to the procedure of Example 1). The fractions 53 to 55 which are identical according to thin layer chromatography are combined with one another and yield a total of 595.2 mg of base.

The resulting base is then chromatographed again on 18 g of basic aluminium oxide with the same solvent system as before. Fraction 33 (267 mg), which proves to be pure and a single substance in a thin layer chromatogram, is dissolved by itself in boiling absolute ethanol and the solution is filtered and allowed to crystallise. 230 mg of base of melting point 200°C are obtained. After repeated recrystallisation from aqueous ethanol and from acetone, a compound of melting point 208°C is obtained, which according to mixed melting point and NMR spectrum is identical with the base of identical melting point from Example 1. However, it is dextrorotatory, $[\alpha]_D^{25} = +1°$ ($c = 0.538\%$).

What is claimed is:

1. Di-(1-isoquinolyl)-di-(2-Pyridyl)-butanes of the formulae A—A, A–B and B—B, in which A and B represent the following groups:

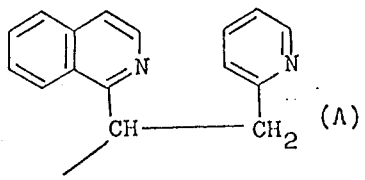     (A)     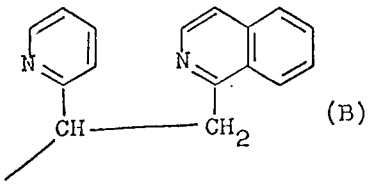     (B)

and their non-toxic salts with inorganic and organic acids.

2. Process for the manufacture of the compounds according to claim 1 and of their mixtures and their salts, characterised in that one compound selected from the group consisting of a vinyl compound of the formula:

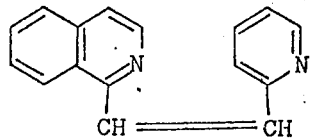

and a salt thereof is subjected to a catalytic hydrogenation carried out in an inert solvent with a catalyst selected from the group consisting of platinum, nickel, and copperchromium oxide catalysts at a temperature between 20°–30°C and at a pressure of from 1 to 2 atmospheres gauge, and the compound thereof, of melting point above 160°C, is (or are) isolated from the resulting hydrogenation product and if desired reacted with a non-toxic acid.

* * * * *

UNITED STATES PATENT OFFICE
CERTIFICATE OF CORRECTION

Patent No. 3,884,925          Dated   May 20, 1975

Inventor(s)   Stanislaw Büchner

It is certified that error appears in the above-identified patent and that said Letters Patent are hereby corrected as shown below:

First (title) page, Col. 1, in the line designated "[73]", relating to the assignee's name, change "Sulco" to -- Solco --.

Signed and Sealed this fourteenth Day of October 1975

[SEAL]

Attest:

RUTH C. MASON
*Attesting Officer*

C. MARSHALL DANN
*Commissioner of Patents and Trademarks*